United States Patent
Heuermann (10) Patent No.: US 8,699,945 B2
(45) Date of Patent: Apr. 15, 2014

(54) DUAL MODE FUNK

(75) Inventor: Holger Heuermann, Stolberg-Breinig (DE)

(73) Assignee: Fachhochschule Aachen, Aachen (DE)

(*) Notice: Subject to any disclaimer, the term of this patent is extended or adjusted under 35 U.S.C. 154(b) by 684 days.

(21) Appl. No.: 12/086,336

(22) PCT Filed: Dec. 5, 2006

(86) PCT No.: PCT/DE2006/002162
§ 371 (c)(1),
(2), (4) Date: Mar. 30, 2009

(87) PCT Pub. No.: WO2007/076757
PCT Pub. Date: Jul. 12, 2007

(65) Prior Publication Data
US 2009/0253375 A1    Oct. 8, 2009

(30) Foreign Application Priority Data
Dec. 20, 2005    (DE) .................. 10 2005 061 219

(51) Int. Cl.
*H04B 7/24*    (2006.01)
*H04B 7/00*    (2006.01)
*H04B 1/00*    (2006.01)

(52) U.S. Cl.
USPC .............................................. 455/39; 455/42

(58) Field of Classification Search
None
See application file for complete search history.

(56) References Cited

U.S. PATENT DOCUMENTS

| | | | | |
|---|---|---|---|---|
| 3,882,393 A | * | 5/1975 | Epstein | 455/59 |
| 3,938,157 A | * | 2/1976 | Brickey | 343/756 |
| 4,198,641 A | * | 4/1980 | Gibson | 343/797 |
| 5,262,788 A | * | 11/1993 | Drabowitch et al. | 342/188 |
| 5,519,885 A | * | 5/1996 | Vaisanen | 455/76 |
| 6,167,286 A | * | 12/2000 | Ward et al. | 455/562.1 |
| 6,411,824 B1 | * | 6/2002 | Eidson | 455/561 |
| 2002/0033770 A1 | * | 3/2002 | Akiyama et al. | 343/700 MS |
| 2004/0056791 A1 | * | 3/2004 | Alford et al. | 342/26 |
| 2004/0209584 A1 | * | 10/2004 | Bargroff et al. | 455/180.1 |
| 2004/0235415 A1 | * | 11/2004 | Atarashi | 455/3.02 |

FOREIGN PATENT DOCUMENTS

| | | | |
|---|---|---|---|
| DE | 198 38 544 A1 | 3/2000 | |
| DE | 19838544 A1 | * 3/2000 | H04B 3/46 |
| EP | 0 656 697 A2 | 6/1995 | |
| EP | 656697 A2 | * 6/1995 | H04B 7/10 |

OTHER PUBLICATIONS

English Translation of DE 19838544 A1 reference, Mar. 2003 in PDF form DE19838544_English, pp. 1-2.*

* cited by examiner

*Primary Examiner* — Yuwen Pan
*Assistant Examiner* — Ayodeji Ayotunde
(74) *Attorney, Agent, or Firm* — Birch, Stewart, Kolasch & Birch, LLP (57) ABSTRACT

The invention relates to the establishment of a radio link using at least two spatial modes (in other words at least horizontal and vertical or right and left circular modes) by means of corresponding antennae or a line link using at least three conductors and the use of at least one transmission oscillator and no oscillator on the reception side, wherein the transmitter has amplitude and/or phase and/or frequency modulation and the at least two different polarized modes are received by means of at least two antennae and processed by one or more multipliers, mixers, phase comparators, frequency comparators, or power detectors.

7 Claims, 5 Drawing Sheets

DUAL MODE FUNK

STATE OF PRIOR ART

Radio links adopted in the high-frequency and microwave field are of outstanding importance for use in modern communication technology. While radio and TV broadcasting used to be the only radio links available to the consumer market back in the eighties, a huge range of applications is now being offered to consumers by standards like GSM, UMTS, DVD, WLAN, Bluetooth, GPS, Galileo, Dect, satellite TV and many others. The wireless system trend is sure to continue in future.

All of these radio link systems are having in common that their transmitters and receivers are based on classical heterodyne or increasingly homodyne frequency conversion techniques.

High-frequency signals have their amplitude and/or phase or frequency digitally modulated with virtually no exception. Such modulated signals are conditioned in computers to an increasing extent and subsequently converted into analog signals via D/A converters which are transferred into the higher MHz or the GHz range by means of low-noise synthesis generators (synthesizers) and single sideband converters (IQ modulators). The high-frequency signals are then by means of a single sideband receiver and a required low-noise local oscillator signal of a synthesizer mixed down in such a way in the receiving branches after low-noise preamplification and narrow-banded bandpass filtering that they can be brought into a state ready for use in a computer by means of an A/D converter.

As will be known, bidirectional transmitting/receiving circuit arrangements need to have two synthesizers for heterodyne and just one synthesizer for homodyne operation. This is also the reason why homodyne systems have made their way in spite of the higher costs involved for IQ modulators. Since the information of the high-frequency transmission path is spaced from a local oscillator signal in the range between a few kHz to a few MHz, said signal is to exhibit very low phase noise. The magnitude of a synthesizer's phase noise at the spacing of the transmission signal tends to restrict the sensitivity and hence the transmission range of the radio system in modern installations.

Free space transmission links offer two potential transmission modes each with their vertical and horizontal and/or right circular and left circular homogenous plane waves. Nearly all transmission standards are using one of these four potential modes. Where two modes are adopted, one would work with two decoupled transmission paths the way as customary in the satellite TV field (in short "sat TV"). This means that two radio systems are operated in parallel such that half a bandwidth only is needed for the same information volume. There is no correlation between signals with the two different modes.

All of the prior known modulations can be traced back to the three processes called amplitude modulation (AM), phase modulation (PM) and frequency modulation (FM). Discrete amplitude and phase modulations are combined (for example QAM) in modern transmission technology to an ever increasing extent. These are allocated to the group of hybrid modulation forms.

CRITICAL ASPECTS OF PRIOR ART

Present-day radio transmission systems are by factors more complex than for instance the promotion-period detector radio adopting amplitude-modulated signals used to be because costly and substantially low-noise synthesizers need to be provided. This is why the costs for electronics are still very high in spite of a most modern high-degree integration thereof. While the classic detector radio required just one oscillator in the transmitter for unidirectional radio transmission there is no modern system whatsoever that could do without oscillators (and normally even synthesizers) in the receiver.

Semiconductor-integrated low-noise synthesizers require at least one very large coil (and hence a very large semiconductor area) and have a relatively high current demand. Transmission systems which are in need of synthesizers only for precise compliance with a given frequency range are hence enabled to work with synthesizers that require much less chip area and are hence less costly and also permit longer battery lives to be achieved.

The present need for use of synthesizers inhibits the arrangement of transmission links in the three-digit GHz range with bandwidths that correspond to those of optical transmission links.

The bulk of radio transmission systems is solely based on transmission by means of just one free space mode and is hence making use of only half the available transmission capacity.

No transmission system is taking the benefit of utilizing the degree of freedom of the correlated signals of the two free space transmission modes.

Hybrid modulation forms simultaneously using AM, PM and FM have not been introduced up to this date although these obviously permit a better bandwidth utilization.

Since the prior art transmission systems are based on modulating a high-frequency signal of known frequency, these processes are subject to the Doppler effect.

ACHIEVABLE BENEFITS

It is an object of this present invention to provide a radio link for two free space modes while simultaneously utilizing the correlation of the signals, i.e. the so-called dual mode radio process.

The full transmission capacity of a radio channel is at all time utilized in this dual mode radio communication. When all of the four modes of a free space radio link even are used the transmission capacity may be doubled once more.

A unidirectional dual mode radio link requires at minimum only one oscillator for the transmitter and no oscillator in the receiver. The phase jitter of the oscillator is not having any influence on the sensitivity and hence the transmission range of the system. This means that a synthesizer for the transmitter would be needed only to ensure that a radio channel will be kept. Seen as a whole, the number of components needed for transmitter and receiver is reduced. Depending on the type of modulation selected, the required number of components would be reduced right down to one high-frequency detector or mixer.

The immense reduction of the hardware volume also has a positive influence on pricing. Substantial omission of a low-noise synthesizer also permits to achieve widest-band radio trans-missions in the three-digit GHz range.

Reduced costs for the manufacture of high-frequency transmission systems not only bring down the price for actual applications, but also open the door to new applications which due to their current costs are still unattractive at present.

All prior known modulation methods may be adopted with the properties they are known to have such as bandwidth requirements, bit error ratios and such like, but their pertinent modulators are distinctly simplified. By means of a multiplier ((Gilbert mixer, ring mixer etc.) for instance it is possible to provide very good receivers for the three basic modulations AM, PM and FM with different output signals. This is why said three modulation types even may be combined which results in an immense increase of the data volume for a given bandwidth.

The fact that the correlation between two signals only is now being evaluated results in that the Doppler effect has no influence on signal transmission any longer. When both of the modulated and correlated signals come from the same oscillator the phase noise thereof has no influence any more.

The two signals from both antennae are normally transposed into an intermediate frequency range by means of a multiplier and/or mixer inside the receiver of dual mode radio systems. This ensures that compared to an (amplitude) detector receiver the sensitivity is doubled in logarithmic terms.

Since the receivers are of extremely simple design, they generally require less energy for power supply. Systems of simplest design such as for instance used in RFID applications will do without any extra current supply at all. For example, two monofrequent signals of identical frequency which are parallel to a so-called FDM signal may provide power supply in dual mode radio processes. The two signals are rectified by means of a passive type ring mixer and made available to the system.

Efforts are presently under way to enable transmission of substantially large data volumes via shielded two-wire line. As will be seen hereafter, this is easy to accomplish with the aid of the novel phase modulation method.

FURTHER MODIFICATION OF THE INVENTION

This dual mode radio system reduced in its technical outfit will bring along novel applications which cannot yet be implemented due to the technical effort they are requiring.

An application with a very promising future is the radio communication between semiconductor circuits, i.e. the radio chip communication which would for instance be very interesting in practice inside a personal computer to provide a connection between microprocessor and memory components. Such a radio link would help to spare a large number of contacts and drivers. The data rates are 700 MHz per data line already now. With the third harmonic included, therefore, a signal line should be rated for 2.1 GHz and the different transit times already must be compensated in practice. Modern transmission standards are differential and terminated at 1000 Ohm on both sides. Briefly, a dual mode radio link at about 20 GHz would allow data transmission rates that would satisfy existing requirements. The antennae required would be of such small size that they could be integrated on a semiconductor chip without problem (in the marginal areas). A big step towards spatial integration of computers would be enabled. Power consumption would show a marked decrease. The phase differential modulation (PDM) hereinafter described would be advantageous for that application.

A second novel application with promising future would be in the road traffic safety field where a very low-cost and purely unidirectional transmission of small data volumes only would be needed. The very simple static frequency differential modulation (FDM) would do for that application. A solar electric dual mode radio transmitter arranged at the back of each traffic sign continuously sends out two frequencies at a spacing df via the two transmission modes.

Each traffic sign has a frequency spacing df allocated to it, for instance in a 1 KHz grid. In the frontend circuit right behind the two antennae there is a mixer arranged inside the vehicles whose low output frequency df is counted out via a plain digital circuit. Momentary speed information may be instantaneously communicated to the driver. This means that especially in the case of two-lane roads it is possible to recognize signs otherwise concealed by trucks.

What ought to be considered a very interesting application is the wideband transmission in the three-digit GHz range. Any digital components like frequency dividers are no longer needed in dual mode radio systems. The absolute frequency position is not playing such an important role in this frequency range as it does in the single-digit GHz range either so that dual mode radio systems may be of very simple design and are hence easy to provide. The very simple PDM for instance permits to transmit 80 to 160 Gbits and more in the frequency range between 100 and 140 GHz with the aid of a QPSK modulator or even an 8 PSK unit depending on applicable EVM requirements.

Crossed antennae provide a simple basis for sending out all of the four free space modes. For easier comprehension the pursuant description refers to a simple digital amplitude modulation having the two states "on" and "off" although four states are available up to now while utilizing two free space modes. An overlay of the linear with a circular polarization will increase the number of states to eight so that there are three potential amplitude values obtained on the receiver side now.

DESCRIPTION OF THE INVENTION

Dual mode radio communication is generally featured by the fact that two or four free space modes are adopted and the differences between the emitted signals are evaluated. Line modes such as common and pushpull modes also may be used instead of the free space modes for which purpose two conductors and one ground (three-wire system) are needed. Dual mode radio processes permit any and all known basic modulation types such as amplitude modulation (AM), phase modulation (PM) and frequency modulation (FM) of which examples will hereafter be described as individual and combined and/or hybrid modulation forms. All of these three basic modulation types even can be combined into what is a most complex configuration for the first time.

Since the difference between two signals is evaluated in dual mode radio transmission all modulations effected in the applications hereinafter described will be referred to as differential modulations (DM).

All other applications going to be described in the following have been reduced to a basic conception that can be adopted for simple applications also, though amplifiers and (bandpass) filters are additionally provided in practice for several reasons.

Description of Amplitude Differential Modulation

Figure 1:
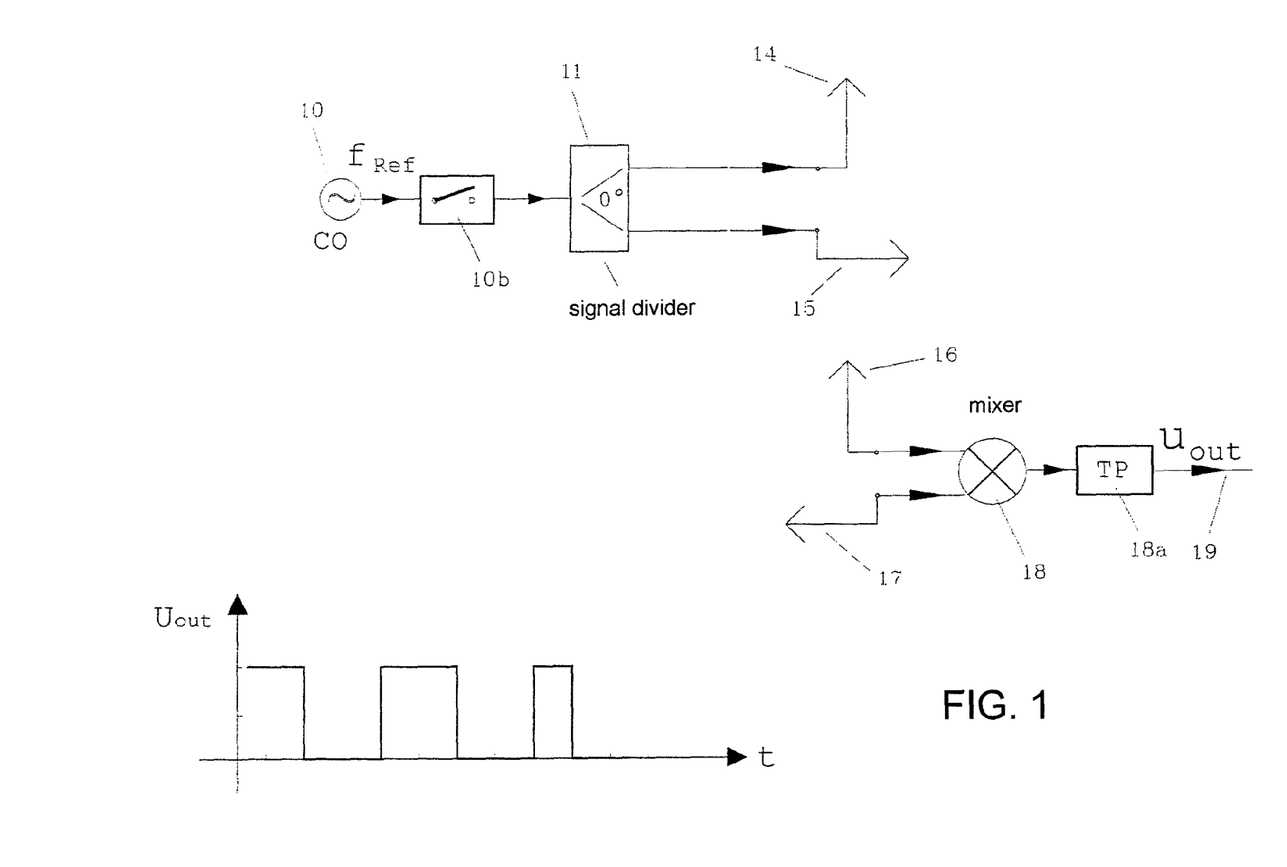
FIG. 1 is a simplified block diagram showing the transmitter unit (left) and the receiver unit (right) and a pertinent received signal for an ASK modulation.

One approach to provide an arrangement of a unidirectional dual mode radio link for amplitude modulated signals is represented in FIG. 1.

A monofrequent high-frequency oscillator 10 (CO=continuous oscillator) sends out a signal having a reference frequency $f_{ref}$. This signal then gets amplitude modulated by digital activation and deactivation for instance which in that particular case is accomplished via a simple (pin diode) switch.

The amplitude modulated signal is split into two paths by means of a signal divider 11.

The two amplitude modulated signals are emitted via a horizontally polarized antenna 15 and a vertically polarized antenna 14.

A horizontally polarized antenna 17 and a vertically polarized antennae 16 receive both signals and transmit them to a mixer 18 provided as a multiplier. One form in practice to realize said mixer is a Gilbert cell. The output signals from the mixer are in the double frequency and in the intermediate frequency range, the latter being determined only by the modulation bandwidth. A lowpass filter of simplest design 18a allows only the lower-range frequency to pass. The signal $U_{out}$ as for example represented in FIG. 1 may be directly utilized as digital received signal in the downstream electronic system.

Other than in classic amplitude modulation is the transmitted signal divided and emitted twice. This means that the number of components is larger in the amplitude differential modulation (ADM) case.

This amplitude differential modulation offers the advantage over and above a classic amplitude modulation that the multiplier is distinctly more sensitive than a power detector. The signals that can be detected at minimum in case of a multiplier are typically to the order of −120 dBm while they are typically −60 dBm only in case of a power detector.

Another version of amplitude modulation in dual mode radio applications provides for two switches to be disposed between the signal divider and the antennae instead of 10b. When these switches are differentially activated (only one switch in fully activated state) the transmitter continuously emits a monofrequent signal, though one that swings between the two free space polarizations.

Figure 2:
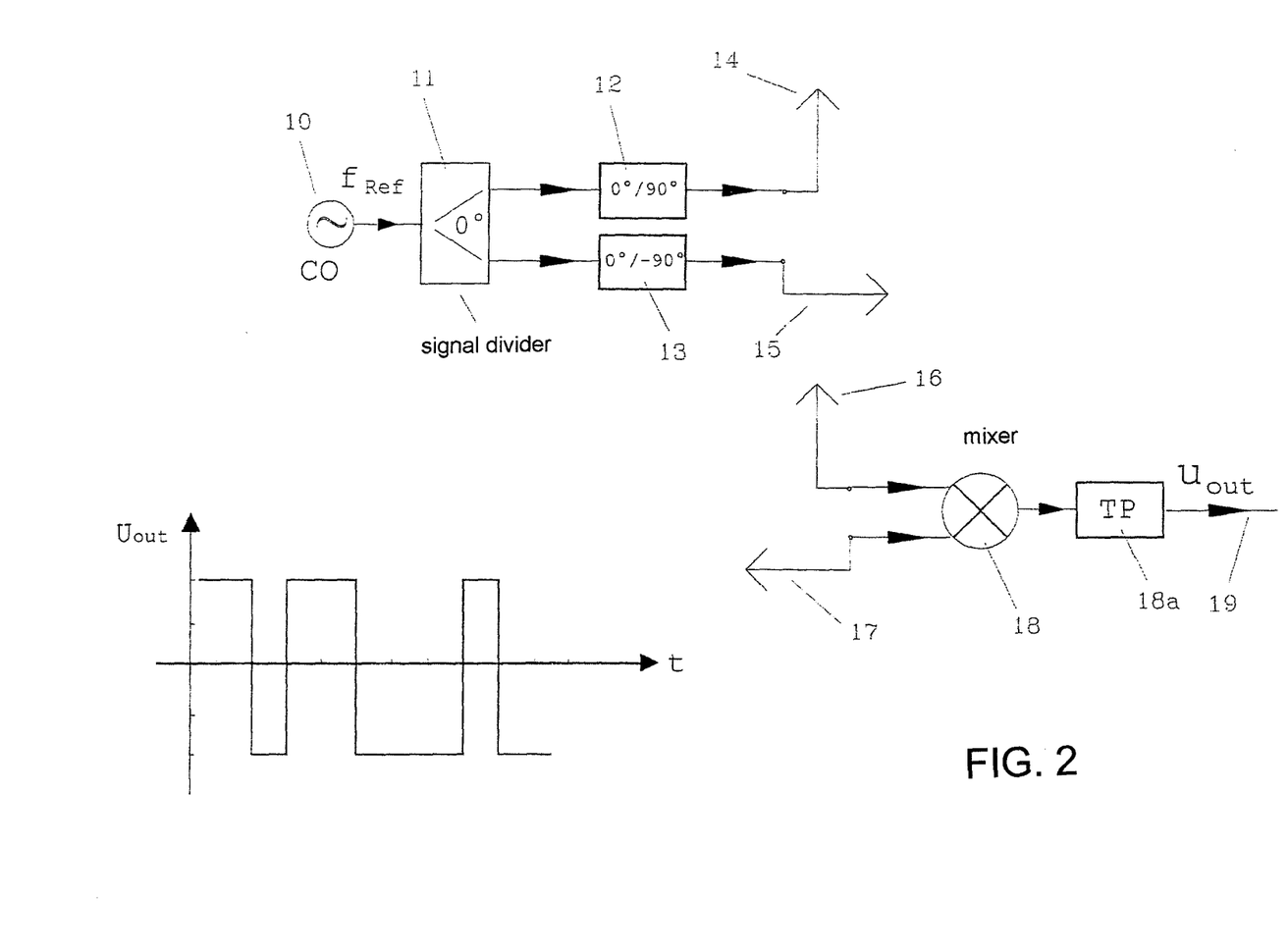
FIG. 2 is a simplified block diagram showing the transmitter unit (left) and the receiver unit (right) and a pertinent received signal for a BPSK modulation.

By placing one power detector behind each of the two receive antennae there is a differential output signal generated which conforms to that shown in FIG. 2. This signal offers a great many advantages in low-frequency signal evaluation.

Description of Phase Differential Modulation (PDM)

One form to provide an arrangement of a unidirectional dual mode radio link for phase modulated signals is represented in FIG. 2.

The monofrequent high-frequency oscillator 10 (CO=continuous oscillator) sends out a signal having a reference frequency $f_{ref}$. This signal is split into two paths by means of a signal divider 11. One 0°/90° and one 0°/−90° phase modulator (12 and 13) are used to vary the phase values of said two monofrequent signals. The 0°/90° modulator may for instance be provided in the form of two change switches, one through-connection and one line of 90° length whereas the 0°/−90° modulator may be constituted of two change switches, one through-connection and one high-pass filter with −90° phase angle rotation.

For a BPSK modulation to be effected the control logic of the two phase shifters is such that both of these are either at 0° or at 90°.

The two phase modulated signals are sent out via a horizontally polarized antenna 15 and a vertically polarized antenna 14.

A horizontally polarized antenna 17 and a vertically polarized antennae 16 receive both signals and transmit them to a mixer 18 provided as a multiplier. The output signals from said mixer are in the double frequency and in the intermediate frequency range, the latter being determined only by the modulation bandwidth. A lowpass filter of simplest design 18a allows only the lower-range frequency to pass.

The signal $U_{out}$ as for example represented in FIG. 2 may be directly utilized as differential digital received signal in the downstream electronic system.

Though a 0°/180° phase modulation is adopted in this case the two channels only need to be phase shifted by 90° to thereby reduce the bandwidth in practice.

It is also interesting to see that the two signals between modulators and mixer conform to a common and a pushpull mode. There are a lot of circuit developments for these two modes which simplify the arrangement of such hardware components as may be additionally need.

It is for this reason that the PDM-BPSK method is of very great interest also for line guided signal transmission. The common and pushpull mode wave resistances of the lines can be calculated easily.

It is also apparent at a glance in conjunction with this type of transmission that fading, i.e. the overlay of multiply reflected signals each with different propagation time, is no problem. Two common mode signals which are also phase-shifted are combined into another common mode signal. The same applies to the pushpull situation. The receive mixer finally determines only if a common mode or a pushpull signal is involved. The signal shape (sine, rectangle, triangle or other) is not playing a role at all.

When the two phase modulators are used separately then the phase differences are 0°, 90°, −90° and 180°. What is concerned here is a QPSK modulation. $U_{out}$ now conforms to the signal shown in FIG. 3.

This implies that double an information volume can be transmitted at the same bandwidth, though the output signals cannot be processed as easily as the output signal of the BPSK system can be.

Description of Amplitude-Phase Differential Modulation (APDM)

Figure 3:
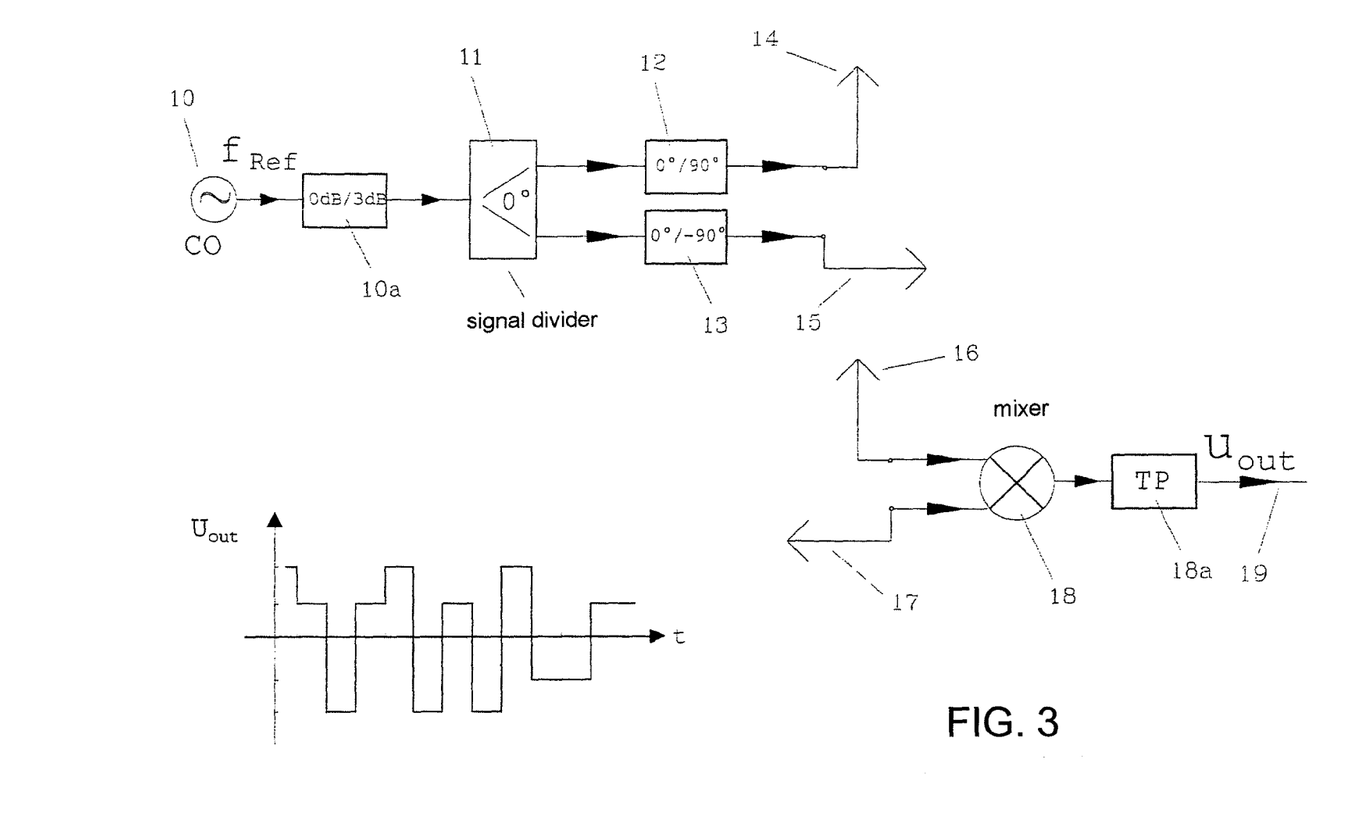
FIG. 3 is a simplified block diagram showing the transmitter unit (left) and the receiver unit (right) and a pertinent received signal for an AM and a BPSK modulation.

One approach to provide an arrangement of a unidirectional dual mode radio link for phase modulated signals is represented in FIG. 3.

The monofrequent high-frequency oscillator 10 (CO=continuous oscillator) sends out a signal having a reference frequency $f_{ref}$. This signal is then amplitude modulated by means of a switchable attenuator pad 10a.

The signal thus modulated is split into two paths by means of a signal divider 11. One 0°/90° and one 0°/−90° phase modulator (12 and 13) are used to vary the phase values of said two monofrequent signals.

To carry a BPSK modulation into effect the control logic of the two phase shifters is such that both of them are either at 0° or at 90°.

The two amplitude and phase modulated signals are sent out via a horizontally polarized antenna 15 and a vertically polarized antenna 14.

A horizontally polarized antenna 17 and a vertically polarized antenna 16 receive both signals and transmit them to a mixer 18 provided as a multiplier. The output signals from the mixer are in the double frequency and in the intermediate frequency range, the latter being determined only by the modulation bandwidth. A lowpass filter of simplest design 18a allows only the lower-range frequency to pass.

The signal $U_{out}$ as for example represented in FIG. 3 comprises four states and hence two bits.

This signal may be evaluated and used in a computer or a down-stream electronic system.

Though a 0°/180° phase modulation is here adopted the two channels need to be phase shifted 90° only which in practice results in a bandwidth reduction.

Description of Frequency Differential Modulation (FDM)

Since this present invention is suitable for providing simplest radio systems, the so-called static frequency modulation shall be introduced in addition to the classic frequency modulation (FM).

Figure 4:
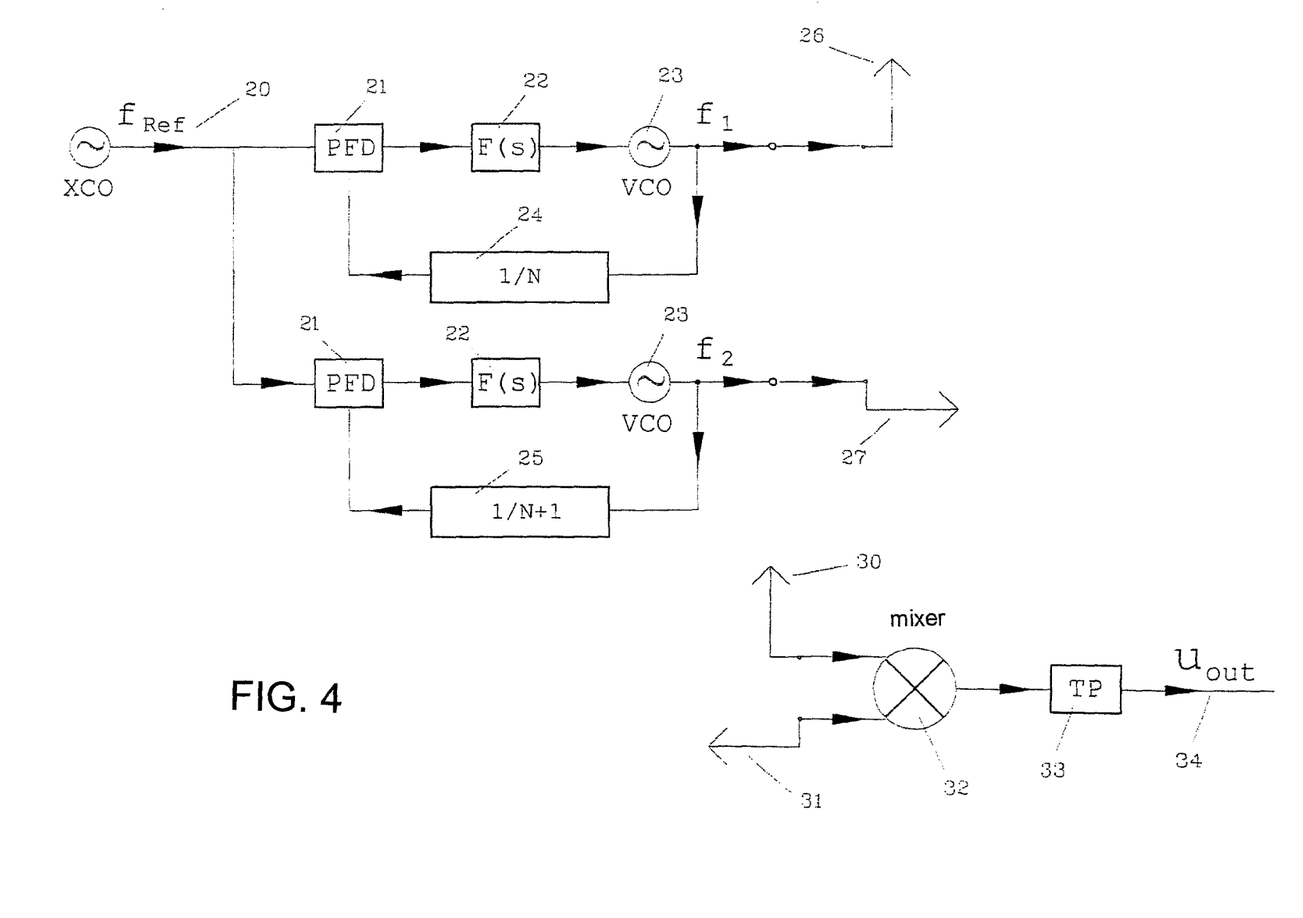
FIG. 4 is a block diagram showing the transmitter unit (left) and the receiver unit (right) for a static or classic FSK modulation.
Figure 5:
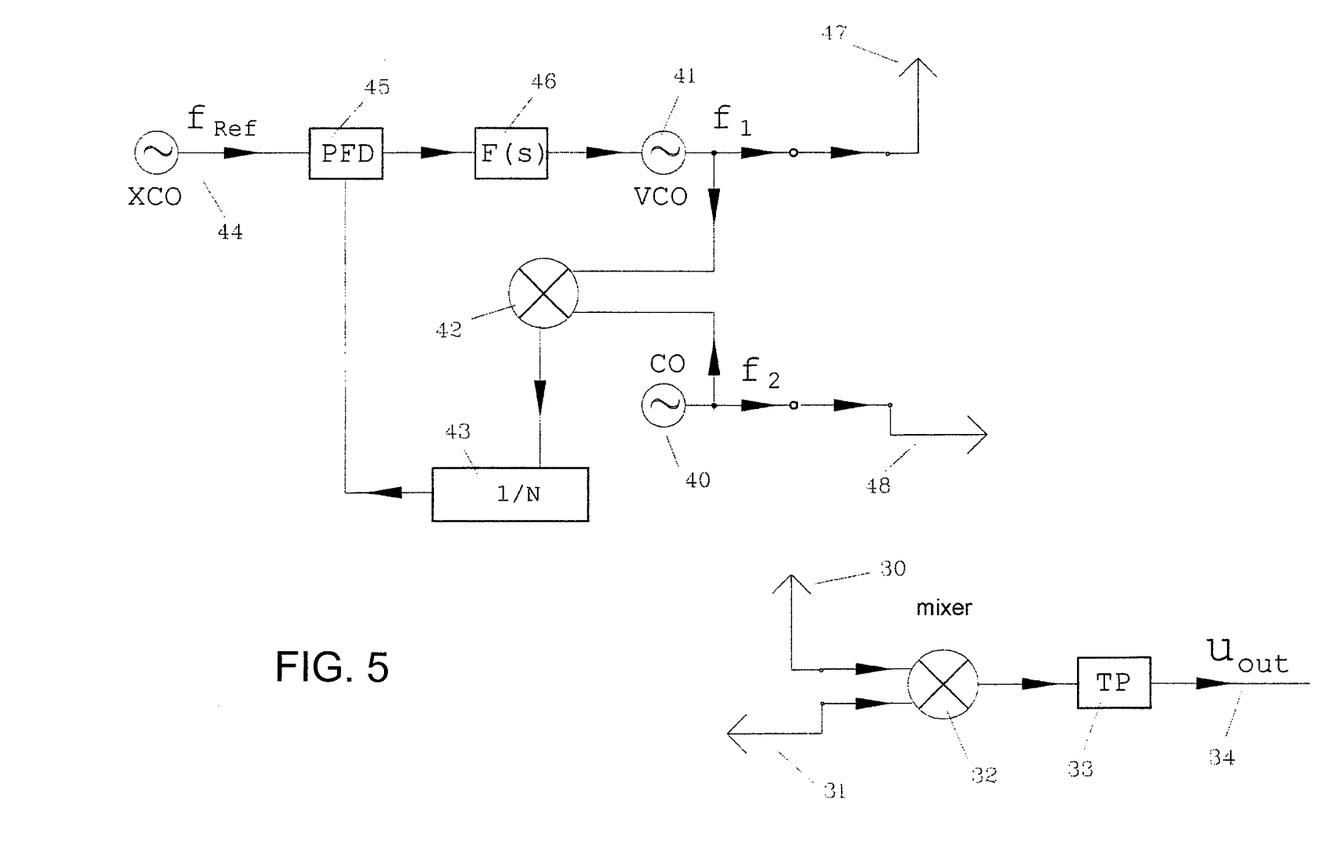
FIG. 5 is a block diagram showing the transmitter unit (left) and the receiver unit (right) for a static and classic FSK modulation.

Two potential block circuit arrangements for such a solution are shown in FIG. 4 and FIG. 5.

Since f1 and f2 are never changed via the frequency in static frequency modulation it is just possible to transmit only one information (not one bit) also. This very simple method is very interesting to provide traffic sign information for instance.

The embodiment shown in FIG. 4 is of interest for applications in the one-digit GHz range since integrated phase-locked loops (PLL) and even integrated synthesizers are available there.

The arrangement with two synthesizers connected to one common crystal controlled oscillator (XCO) 20 is reflected by a unidirectional dual mode radio link for frequency-modulated signals.

Two voltage controlled oscillators (VCO) 23 supply output signals having frequencies f1 and f2.

To make sure that these frequencies are crystal stabilized the high-frequency signals are converted into signals having a frequency $f_{ref}$ via frequency dividers 24 and/or 25 and their related divider ratios (expressed as 1/N and/or 1/(N+1)).

Whenever there are frequency and/or phase differences between the signals as split and reference frequency, phase frequency discriminators (PFD) 21 give out a control signal which passes a filter 22 and readjusts the VCO if so required.

A horizontally polarized antenna 27 and a vertically polarized antenna 26 emit the two monofrequent signals.

A horizontally polarized antenna 31 and a vertically polarized antenna 30 receive both signals and transmit them to a mixer 32 provided as a multiplier. This mixer has two output signals having frequencies $f_1+f_2$ and $df=f_1-f_2$. The maximum frequency of df is only determined by the modulation bandwidth. The static frequency modulation is directed to the maximum permissible value for df. A lowpass filter 33 of simplest design allows only the differential frequencies df to pass. The signal $U_{out}$ is now a low-frequency sine signal having the frequency df.

This change signal is easy to evaluate by means of an electronic frequency counter.

An output signal conforming to that of a frequency counter with analog output signal is directly obtained by using a frequency detector (PFD) instead of a mixer.

In classic frequency modulation it is that the frequency divider which may be controlled as fractional divider with or without sigma-delta modulation also will be quickly modulated by means of just one synthesizer.

Though in that case double a hardware extent is needed for the transmitter the extent needed for the receiver is considerably reduced. Where a system comprises a definitely larger number of receivers than transmitters the dual mode radio approach is the less expensive solution.

Another advantage resides in that both of the synthesizers may now be modulated so that each synthesizer unit needs to perform only half a frequency swing.

The second arrangement form shown in FIG. 5 is a very interesting conception especially for the two-digit and three-digit GHz range.

One fixed oscillator 40 sends out the monofrequent high-frequency signal with a frequency $f_2$.

A mixer 42, a divider 43 and a PFD 45 take care that the frequency spacing of the output signal from VCO 41 having the absolute frequency $f_1$ will be transformed into a crystal-stabilized frequency $f_2$.

The divider 43 should only be capable of reliably processing the maximum frequency at the spacing df. The values of divider are markedly lower in practice than those of dividers 24 and 25. This results in that control of the phase noise of VCO is substantially improved. Hence this arrangement will offer much better transmission properties than the one according to FIG. 4.

The configuration of the receiver is the same as described earlier herein.

Description of Amplitude-Phase-Frequency Differential Modulation (APFDM)

Other than according to the prior art until this date in which there is no real difference being made between PM and FM, the receivers of identical design as hereinbefore described supply different output signals for phase and frequency modulation.

This is the reason why a DM receiver is also capable of demodulating all of the three informations.

To evaluate such an output signal it is however necessary to implement a so-called timing recovery arrangement. This circuit arrangement is standard for present radio links.

It is an advantage that the information volume markedly increases even further at the same bandwidth.

Description of 4-Mode Differential Modulation (X4DM)

All the methods hereinbefore described can be directly adopted in applications with right and left circular free space mode.

All of the four free space modes may however be used for transmission which shall now be explained with reference to an example of a phase modulation of all four free space modes.

EXAMPLE

P4DM

The known receiver (for instance FIG. 2) is provided twice on the reception side with each unit implemented to a linear and a circular polarized pair of antennae.

One 1-to-4 signal divider may be used instead of the signal dividers 11 on the transmitter side. It is by dual use of phase shifters 12 and 13 that linear and circular polarized waves are now fed via a PDM. When for instance effecting a dual BPSK the output signal represented in FIG. 2 is in both channels lowered to minimum one half or raised to maximum one and a half level by the second modulation. Voltage is still distinctly above or below zero Volt in any case.

Consequently it is possible to transmit double an information volume this way also at the same bandwidth, though the signal quality and hence the bit error rate is being impaired also in this example.

When using a crossed antenna with 90° phase shifters it is possible to transmit or receive all four signals via this one antenna.

The invention claimed is:

1. An arrangement for a radio link using at least two free space modes by associated antennas, the arrangement comprising: a transmitter including a transmit oscillator and at least one of amplitude modulators, phase modulators or frequency modulators; and a receiver that receives at least two different-polarity modes sent from the transmitter by two antennas, wherein the receiver is provided with a merger to multiply the different-polarity modes with each other without involving an oscillator, wherein the transmitter further includes a signal divider which splits a signal into a plurality of paths, and wherein a differential modulation is carried out to the signal in each of the plurality of paths by the at least one of amplitude modulators, phase modulators or frequency modulators, so that, for each of the plurality of paths, differential modulated signals containing the at least two different-polarity modes are sent from the transmitter by the two antennas.

2. The arrangement according to claim 1, wherein the transmitter comprises only one transmit oscillator for a fixed average transmission frequency, and the transmitter has one or more amplitude modulators.

3. The arrangement according to claim 1, wherein the transmitter comprises only one transmit oscillator for a fixed average transmission frequency and the transmitter has two or more phase modulators.

4. The arrangement according to claim 2, wherein the transmitter has two or more phase modulators.

5. The arrangement according to claim 1, wherein the transmitter is provided with two or more synthesizers which are linked to a crystal-controlled oscillator and the frequency of which is variable via a change of frequency divider ratios.

6. The arrangement according to claim 2, wherein the transmitter is provided with two or more synthesizers which are linked to a crystal-controlled oscillator and the frequency of which is variable via a change of frequency divider ratios.

7. The arrangement according to claim 4, wherein the transmitter is provided with two or more synthesizers which are linked to a crystal-controlled oscillator and the frequency of which is variable via a change of frequency divider ratios.

* * * * *